Dec. 30, 1969  H. WESTMIJZE ET AL  3,486,400
POSITIONING APPARATUS FOR MOVING A BODY INTO A DESIRED POSITION
Filed Dec. 22, 1967  2 Sheets-Sheet 1
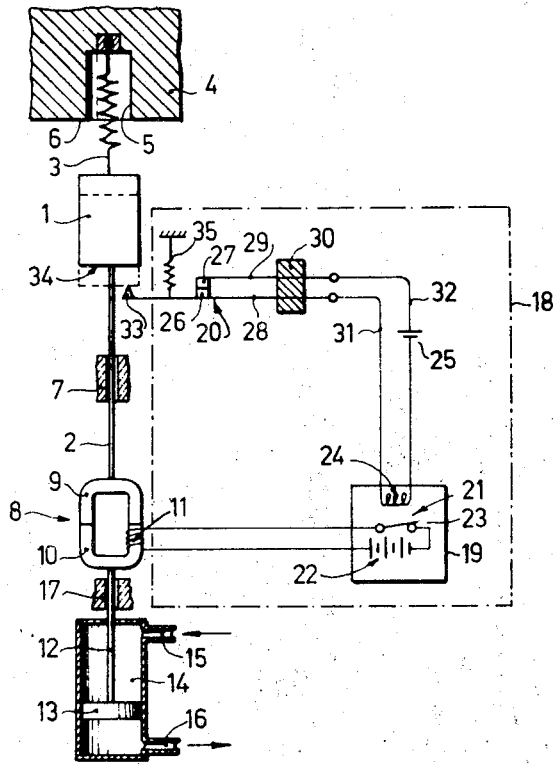
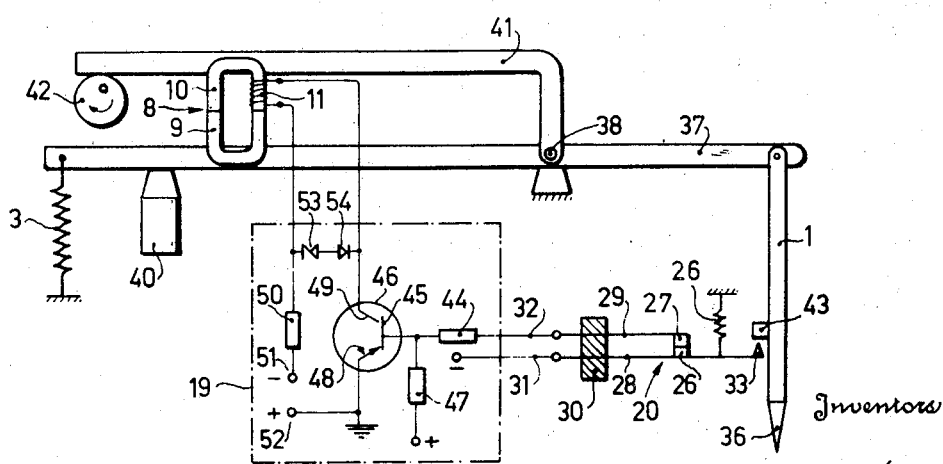
Inventors
HERMAN WESTMIJZE &
DIRK JAN RAABEN
By Stevens, Davis, Miller & Mosher
Attorneys

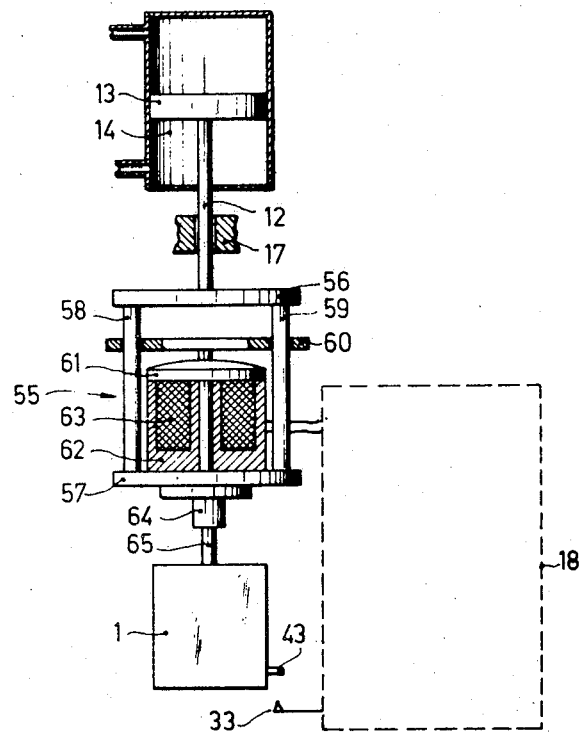
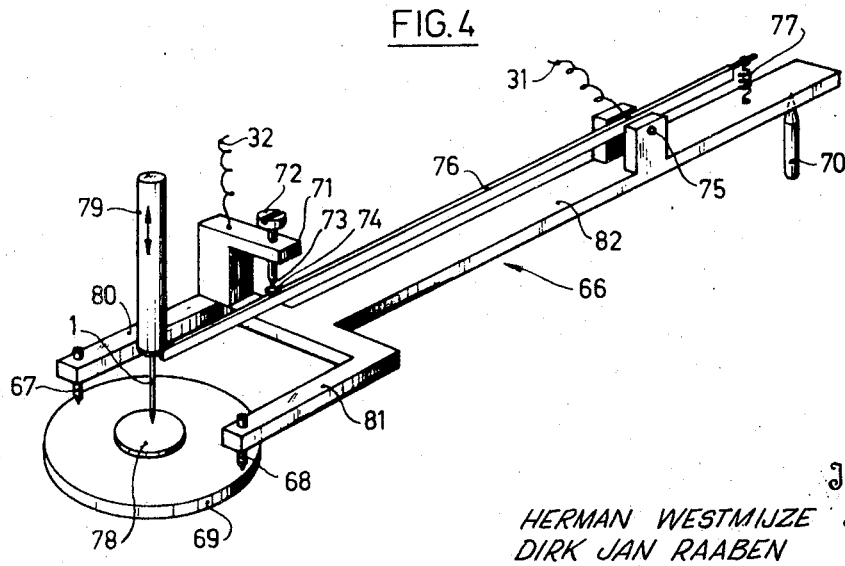

United States Patent Office 3,486,400
Patented Dec. 30, 1969

3,486,400
POSITIONING APPARATUS FOR MOVING A BODY INTO A DESIRED POSITION
Herman Westmijze, Velp, Gelderland, and Dirk J. Raaben, Dieren, Gelderland, Netherlands, assignors to Algemene Kunstzijde Unie, N.V., Arnhem, Netherlands, a corporation of the Netherlands
Filed Dec. 22, 1967, Ser. No. 692,832
Claims priority, application Netherlands, Dec. 24, 1966, 6618164
Int. Cl. B23b 39/10, 47/24; B26d 5/08
U.S. Cl. 77—32.9        15 Claims

ABSTRACT OF THE DISCLOSURE

This specification discloses a positioning apparatus for bringing a driven member such as a machine tool to a predetermined position. An electromagnetic coupling is provided between the driving mechanism and the driven member, which coupling is deenergized when the driven member gets to the desired position. The deenergization of the coupling is initiated by a limit switch, which is actuated when the driven member is moved to the desired position. In some embodiments a spring or other means is provided to apply a force to the driven member counteracting the force applied to the driven member by the driving mechanism through the electromagnetic coupling. The engageable members of the coupling are reengaged after being disengaged by a means independent of the electromagnetic coupling such as the driving mechanism.

BACKGROUND OF THE INVENTION

The invention relates to a positioning apparatus for moving a body into a desired position, comprising a driving mechanism for displacing said body, an electromagnetic coupling one part of which is coupled with the driving mechanism and another part with the body, a switch mechanism for selectively exciting the electromagnetic coupling, which switch mechanism comprises a limit switch which co-operates with the body and serves to switch the excitation current of the electromagnetic coupling. A known apparatus of this type is used for a simple slide positioning system. In that case the coupling is disengaged via an amplifier and with the aid of adjustable stops on the slide and limit switches upon the slide reaching its desired position.

With such an apparatus it is evident that after the limit switch has been actuated the slide does not immediately stop. This "overtravel" depends on the switching-off time of the coupling, the approach speed, and the forces counteracting the movement of the slide. If all these factors were not subject to any variation, then they might be entirely compensated for by switching off the coupling so much earlier that the slide would come to a stop exactly in its desired position. In general, however, these factors are not constant but subject to uncontrollable variations which reduce the positioning accuracy.

Many attempts were made to reduce the switching off time of the electromagnetic coupling. As is known, when the excitation coil is switched off there occurs a self-induction voltage the magnitude of which must be restricted in order to safeguard the switch. To this end use is made of diodes which are connected in parallel with the excitation coil. The diodes short-circuit the coil when the excitation current is cut out but prolong the switching off time. For that reason, use is sometimes made of voltage-dependent resistors whose resistance decreases as the applied voltage is increased.

SUMMARY OF THE INVENTION

In the positioning apparatus according to the invention the switching off problem is approached from a different angle. The present positioning apparatus is characterized in that, independent of the electromagnetic coupling, operating means are provided to reengage the disengaged electromagnetic coupling members. By stating that the operating means is independent of the electromagnetic coupling, it is meant that not the electromagnetic coupling itself but the additionally provided operating means serve to move the coupling members into contact with one another. The arrangement proposed makes it possible for the switching off time to be considerably reduced, because the number of ampere-turns of the excitation coil only needs to be sufficient to transet the driving force through the coupling.

Various operating means are conceivable. For instance, coupling may be effected by means of an electromagnet whose armature presses the coupling members together, or coupling may be done hydraulically or pneumatically. In the preferred embodiment, however, the operating means should form part of the driving mechanism.

Preferably the positioning apparatus is provided with means which, at least during the last portion of the movement of the body to its desired position, exerts on said body a force which conteracts said movement. Although the driving force that is to be transmitted by the electromagnetic coupling must be correspondingly larger when a means to exert a counteracting force is used, the use of such means has the advantage that under the influence of the counteracting force a rapid exhaustion of the kinetic energy of the moving mass can be obtained after the excitation of the coupling has been switched off. The rapid exhaustion of kinetic energy contributes to the movement of the body being quickly stopped. This feature is important because there is always some delay between the moment the limit switch initiates the switching off of the excitation of the coupling and the moment the energization is actually switched off. This delay would not give rise to any problems if the variation in the speed of the body during the switching off time were always the same. However, there are many applications in which the movement of the body is resisted by a variable force, such as, for example, when holes are punched in spinnerets. In such applications there is no reproducible speed variation during the switching off time. If in such cases extremely low speeds are not desirable, then the switching off time must be kept sufficiently short so that under very unfavorable conditions, the actual position to which the body is moved does not deviate from the desired position beyond the permissible tolerance. The counteracting force may be effected by having the movement of the body resisted by a sufficiently high friction. In that case the body will stop when it is in its desired position.

If it is required or at least permissible to immediately reverse the direction of movement of the body after it has reached its desired position, then the counteracting force may with advantage be applied by means of an elastic element.

The elastic element may be, for example, a leaf spring, a helical spring or a torsion spring, depending on whether the point of the body where the counteracting force is applied makes a translatory or a rotary movement. The elastic element also may be used to ensure that the body is returned to its initial position.

The driving mechanism according to the invention is further characterized in that the electromagnetic coupling comprises an excitation coil and two magnetizable core parts with very low eddy-current loss, of which one core part is coupled with the body and the other with the driving mechanism. To reduce the eddy-current loss it is preferred to use an embodiment of the driving mechanism in which the core parts are built up of thin laminations.

In addition, it is preferable that the core parts while in the excited state are separated by, for example, an anti-adhesive plate or air gap creating a relatively high magnetic resistance.

A very advantageous feature in one embodiment further reduces the switching off time. In this embodiment there is provided at least one zener diode, which sets an upper limit to the self-induction voltage which occurs when the exitation of the electromagnetic coupling is switched off. The zener diode is connected in the blocking direction relative to the polarity of the self-induction voltage.

The zener diode serves to limit the self-induction voltage which occurs when the excitation of the coupling is switched off to a permissible value resulting in a minimum of dropout delay. The term "dropout delay" is used here to mean the time delay before the movement of the core parts of the electromagnetic coupling away from each other after the excitation of the latter has been switched off.

The zener diode may be connected in parallel with the switch. However, the zener diode is preferably connected in parallel with the excitation coil of the electromagnetic coupling. Upon switching off the excitation, there is formed a resistive inductive circuit of which the resistance R is only or mainly determined by the zener diode.

The limit switch could be of a type without moving elements. For example, the limit switch could be a combination of a light-sensitive element such as a photoresistor or a phototransistor, and a light source, the light of which is directed onto said element. Switching off could then be initiated by exposing the light-sensitive element to light when the body reaches the desired position, or by interrupting the exposure of the light sensitive element at that particular moment. This change in the exposure could be effected by the body itself or by a screen connected thereto. It should be added, however, that it is desirable that said change in the exposure to light should be completed in the shortest possible time.

The switching problems involved can be obviated in a simple way if the limit switch comprises a switch frame relative to which said body makes its movement and which carries a first contact and an operating element which comes into contact with the body when the latter has reached its desired position and which carries a second contact which co-operates with the first contact.

Preferably, the contacts of the limit switch form a break contact, which means that the limit switch is normally closed but is opened as soon as the body reaches its desired position. In this way contact chatter is avoided and accordingly the speed of swithing off is increased. Moreover, with this arrangement, it is possible then to detect fouling of the contacts. For, if the contact resistance prevailing when the limit switch is closed were too great due to fouling, the electromagnetic coupling would not be excited. With a make contact, on the other hand, fouling could lead to the excitation not being switched off, so that the movement of the body would no longer be limited.

One embodiment of the driving mechanism for effecting an at least substantially translatory movement of the body is characterized in that the body is coupled to a first lever, which can turn on a fixed fulcrum. A second lever is hingedly connected with the first lever. The two core parts are placed opposite each other and are connected, respectively, with the first and the second levers. The driving force is exerted on the second lever. The first lever is coupled with an elastic element, which exerts on the first lever a force that counteracts the driving force. The elastic element serves to return the lever system together with the body to the initial position when the electromagnetic coupling is no longer excited.

The fulcrums of the first and the second levers are made to coincide. This feature permits the mass that is to be put in motion by the elastic element when the excitation has been removed to be made as small as possible. The mass put in motion by the elastic element only comprises then the first lever and the body coupled thereto.

The invention also relates to a machine tool for machining workpieces, which machine tool is provided with a positioning device for effecting a relative movement between the tool and the article. The positioning device for effecting the relative movement between the tool and the workpiece is of particular importance in machine tools used for making holes in the latter.

In this embodiment the limit switch comprises a fork-shaped switch frame which has two prongs and a shank and which has three points of support. Two of the points of support are at the ends of the two prongs and the third is at the free end of the shank. At least the former two points of support are on the measuring or working surface positioned so that the line connecting them intersects the center line of the tool. A switch arm is hingedly coupled with the switch frame and is operated by the tool. One of the two co-operating contacts of the switch is attached to the switch frame and the other contact is attached to the switch arm.

The invention will be further described in detail below with reference to the accompanying drawings, which show, by way of example, some embodiments of the driving mechanism.

DESCRIPTION OF THE DRAWINGS

FIGURES 1 and 2 show two embodiments of the positioning apparatus according to the invention.

FIGURE 3 shows another embodiment of the positioning mechanism used in the manufacture of spinnerets.

FIGURE 4 shows a switch construction used in the embodiment of FIGURE 3.

DESCRIPTION OF THE PREFERRED EMBODIMENTS

In the figures like numerals refer to like parts.

In FIG. 1 the numeral 1 designates a body which is to be moved in a downward direction to a desired position indicated by dashed lines. At one end the body 1 is attached to a connecting rod 2 and at its other end the body 1 is attached to the end of a helical spring 3. The other end of the helical spring 3 is attached to a fixedly mounted block 4, which is shown only partly and has a recess 5. The bottom surface 6 of the block 4 serves as a stop face for the body 1. The connecting rod 2 moves through a bearing bush 7, which ensures that the body 1 only moves rectilinearly. At its bottom end the connecting rod 2 is attached to an electromagnetic coupling 8. The electromagnetic coupling comprises two magnetizable core parts 9 and 10, which are built up of U-shaped laminations. An excitation coil 11 is provided around the core part 10. The core part 10 is attached to one end of a piston rod 12, which at its other end is attached to a piston 13. The piston 13 can move in a cylinder 14. Above the piston 13, a liquid or a gas can be fed into the cylinder 14 by way of a conduit 15. Liquid or gas can be discharged from the cylinder by way of a conduit 16. A bearing bush 17 guides the piston 13 in its movement.

Switching on and off of the excitation of the electromagnetic coupling 8 is effected by means of a switch mechanism 18, which is indicated by a dash-and-dot line. The switch mechanism comprises a switching and a limit switch 20. The switching unit 19 consists of a relay 21 and a battery 22 for supplying the excitation current to the electromagnetic coupling 8. In the position shown in the drawing the relay contact 23 is closed, so that current flows through the excitation coil 11. The relay winding 24, together with the limit switch 20 and a power supply 25, forms part of a control circuit for controlling the switching position of the relay contact 23. The limit switch has two contacts 26 and 27, which are provided on contact springs 28 and 29, respectively. The contact springs are fastened at their right-hand ends in a fixedly mounted, insulating support 30. By way of two lines 31 and 32 and the power supply 25 the limit switch is connected with the relay winding 24. The contact spring 28 serves as an operating member for the limit switch 20. For this purpose it carries at its left-hand end a projection 33, which co-operates with the bottom surface 34 of the body 1. A spring 35 keeps the contacts 26 and 27 together when the projection 33 is not in contact with the body 1.

The above-described driving mechanism operates as follows:

When the limit switch 20 is closed, current will flow through the control circuit exciting the relay winding 24 so that the relay contact 23 is closed. Accordingly a current will flow through the excitation coil 11 so that the two core parts 9 and 10 are held in contact with each other. When a liquid or gas is fed to the cylinder through the conduit 15, the system of the piston 13, the piston rod 12, the electromagnetic coupling 8, the connecting rod 2 and the body 1 will move downwards, and the spring 3 will be tensioned. In this downward movement the bottom surface 34 of the body 1 will eventually strike the projection 33 of the operating member 28. The contacts 26 and 27 will then be separated, as a result of which the relay contact 23 will open and the excitation of the electromagnetic coupling 8 is turned off. By the action of the spring 3 the body 1 will return to its initial position, which is determined by the stop face 6. By exchanging the supply to and the discharge from the cylinder 14, the piston 13 with the piston rod 12 can be caused to move the lower core part 10 towards the upper core part 9 to have them coupled again.

FIG. 2 shows an embodiment with a slightly different electromagnetic coupling. The body 1, which, for example, may be the slide of a machine tool which is to be accurately positioned, is by way of a frame 55 driven by an air cylinder 14. The frame 55 comprises two cross members 56 and 57 which are united into one rigid system with the aid of guide rods 58 and 59. Adapted to move over the guide rods 58 and 59 is a sliding member 60, which is connected with a core part 61. The core part 61 is a round disk, which, in the position shown, rests on a cylindrical core part 62. The core part 62 is attached to the cross member 57 and is provided with a recess in which there is an excitation coil 63. The excitation coil 63 is connected with the switch mechanism 18, which corresponds to that of FIG. 1. The core parts 61 and 62 are made of magnetizable material with a low eddy current loss. The lower cross member 57 carries a guide bush 64, through which there may slide a rod 65. The rod 65 is coupled to the body 1 and is made of non-magnetizable material. The rod 65 passes through a bore in the core part 62 and is connected to the core part 61. The body 1 has a stop 43, which co-operates with the projection 33 of a limit switch of the switch mechanism 18 in the way described with reference to FIG. 1.

The operation is as follows: Let it be assumed that current is passing through the excitation coil 63 and that the core parts 61 and 62 are to be in contact with each other. When the piston 13, with respect to the plane of the drawing, moves in a downward direction, the movement will be transmitted from the piston rod 12 by way of the frame 55, the core parts 61 and 62 and the rod 65 to the body 1. When the stop 43 strikes the projection 33, the switch mechanism 18 switches off the excitation of the coil 63 so that the coupling between the core parts 61 and 62 is broken. The kinetic energy of the slide and the other moving parts may be absorbed by the action of a spring or by friction. In the former case an extension spring may be positioned, for example, between the cross member 56 and the sliding member 60. The movement of the body 1 would then be reversed after the excitation has been switched off. If the kinetic energy is to be absorbed by way of friction, the desired frictional force may be effected by the appropriate choice of the parts sliding on each other (coefficient of friction) and the normal force.

FIG. 3 schematically shows a driving mechanism according to the invention used for driving a drill or punch of a spinneret-drilling machine. Drilling or punching the spinning orifice in a spinneret is in general carried out in more than one stage. In each of these stages the depth to which the drill or punch penetrates the spinneret bottom is to be accurately controlled. There now follows a description of the construction and operation of the driving mechanism shown in FIG. 3. In this case the body to be moved is a punch 1, of which the hardened point 36 is to be pressed into the bottom of the spinneret. At its top end the punch 1 is pivotally coupled with a lever 37, which hinges on the fixed fulcrum 38. A spring 3 keeps the left-hand end of the lever 37 in contact with a stop 40. Hinging on the same fulcrum 38 is a second lever 41, which rests on an eccentric 42. Attached to the two levers 37 and 41 are two facing, laminated, U-shaped core parts 9 and 10, respectively. Provided around the core part 10 is an excitation coil 11. The limit switch 20 is mounted on the work support (not shown) and co-operates with a stop 43 provided on the punch 1. By way of the lines 31 and 32 the limit switch 20 is connected with a switching unit 19. The line 32 connects to a resistor 44, which is connected to the base 45 of a PNP transistor 46. A second resistor 47, the resistance of which is large compared with that of the resistor 44, is connected between the base 45 and a voltage source, which will keep the base 45 at a positive potential relative to the emitter 48 when the transistor is turned off. The line 31 has applied thereto a negative potential relative to the emitter 48. The collector 49 of the transistor 46 is, by way of the excitation coil 11 and a dropping resistor 50, connected to the negative pole 51 of a voltage source (not shown), the positive pole 52 of which is connected to the emitter 48. Connected in parallel with the excitation coil 11 is the series connection of a zener diode 53 and an ordinary diode 54.

The above-described driving mechanism operates as follows. When the punch 1 is in its initial position in which it is shown in the figure, the limit switch 20 is closed. In this condition, the base 45 of the transistor 46 has a negative potential relative to the emitter 48, so that the transistor 46 is conducting. Full current accordingly flows through the excitation coil 11, as a result of which the core parts 9 and 10 are held together with considerable force. If the eccentric 42 is rotated, the lever 41 will turn to the right, which movement will, by way of the excited electromagnetic coupling 8, also be transmitted to the lever 37. The punch 1 will move to the workpiece to machine the latter as desired. The force exerted on the lever 41 by the eccentric 42 must be sufficiently large to overcome the counteracting force of the spring 3 and the resistance offered by the workpiece. However, the number of ampere-turns of the excitation will not exceed the relatively low number required to keep the core parts pressed together. In the downward movement of the punch 1 the stop eventually strikes the projection 33 of the limit switch 20. The limit switch is opened so that the initial negative base-emitter voltage is removed and replaced by a positive base-emitter voltage. As a result, the transistor 46 is turned off, so that a current of only a low magnitude flows through the excitation coil 11. This abrupt and large decrease of the current causes a self-induction voltage, which gives rise to an elevated collector-emitter voltage. This elevated collector voltage could lead to destruction of the transistor. However, this is prevented by the zener diode 53, which is so connected that it limits the self-induction voltage. The zener voltage of the zener diode 53 is selected to be equal to the collector voltage that is just permissible. If the permissible collector voltage is relatively high, a few zener diodes can be connected in series. Because of the voltage-current characteristic of the zener diode, the self-induction voltage during switching off is maintained for some time at a value determined by the zener voltage. This means that connected in series with the excitation coil is a D-C resistance, the magnitude of which increases in inverse proportion to the current. The time constant of the resistance-inductance circuit therefore decreases accordingly as the switching off transient nears its end. As a result, rapid switching off is ensured. Switching off is effected rapidly also because, as mentioned above, relatively few ampere-turns are required to keep the core parts together. As soon as the force with which the core parts 9 and 10 attract each other is no longer sufficient to overcome the counteracting forces, the force exerted by the spring 3 will prevail. The spring 3 returns the lever 37 with the punch 1 to its initial position, in which the former is in contact with the stop 40. The counteracting force exerted by the spring 3 is important both to minimize overshooting of the punch after the limit switch 20 has been opened, and to prevent the punch from getting stuck in the workpiece. Sticking of the punch in the workpiece could occur if the deformation of the spinneret material during the downward stroke of the punch is partially removed, so that the point of the punch jams.

After the spring 3 returns the lever 37 to its initial position, the limit switch will be closed again, so that a current flows through the excitation coil 11. As soon as the eccentric 42 permits, the core parts 9 and 10 are pressed together again and the above-described process is repeated. It will be clear that it is not necessary to bring the core parts together by increasing the excitation current. The diode 54 ensures that when the electromagnetic coupling 8 is excited, the current through the transistor 46 flows in the largest possible measure through the excitation coil.

The embodiment shown in FIG. 3 is especially attractive in those cases where the construction, viewed in the direction of movement of the body is to be of small height. Comparison of the embodiments of FIGS. 1 and 2 with that of FIG. 3 will clearly reveal this.

With the embodiment shown in FIG. 3 the electromagnetic coupling is excited every time the limit switch 20 closes. Therefore, per revolution of the eccentric 42 the punch 1 is reciprocated once. However, it is also possible to move the punch at any desired moment, while the eccentric continues rotating. This may be effected by having the presence of the excitation be dependent not only on the limit switch 20, but also on a command pulse. It will be clear to a man skilled in the art that this can be realized with the aid of a logic circuit.

To prevent the excitation from being improperly switched on by interference pulses, use can be made of interference-eliminating capacitors, which recognize pulses as command pulses only if they have some minimum duration. If switching off is to be very rapid, the transistor and the construction of the electromagnetic coupling 8 and of the limit switch must be chosen carefully. The transistor should require only a short period of time to change from the conducting to the non-conducting state, should be able to withstand a reasonably high collector voltage, and should also require relatively low control energy.

If it is desired to increase the permissible self-induction voltage in order that switching off may be even more rapid, use could be made of more transistors, which are connected in series and are all controlled by the limit switch. In such a circuit, it would be possible for all of the transistors not to be blocked simultaneously; in order to prevent the transistor that is blocked most rapidly from having to sustain the entire self-induction voltage, a Zener diode may be connected across each of the transistors. If use is made of two transistors, the Zener voltage of these diodes must be equal to half the total permissible self-induction voltage.

As far as the electromagnetic coupling is concerned very favorable results have been obtained using as core parts tape-wound cores made of laminations 0.05 mm. in thickness. Suitable magnet materials are those known by one of the trade names Permenorm 5000 H2, Permenorm 3601 K2 and Trafoperm N2/OR. The composition and properties of these materials are described in the pamphlet "Schnittbandkerne," Ausgabe 1963, FS-M6, of Messrs. Vacuumschmelze A.G. Of these three materials Permenorm 3601 K2 has the highest specific resistance. Since the switch-off time is also dependent on the degree to which the occurrence of eddy currents in the core material can be prevented, it is of great importance that the core material should have a high specific resistance.

In order to prevent the two core parts from sticking together after switch-off, the magnetic cores may be maintained some distance apart while the coupling parts are in engagement. Favorable results have been obtained using a core spacing or air gap of 0.05 mm. Although on account of this air gap the required number of ampere-turns is larger than in the case where the two cores are in contact with each other, the switch-off time is shorter.

It is further of advantage to realize the required number of ampere turns by applying a relatively high current. The magnetic field energy may then be dissipated within a shorter time for a given self-induction voltage. Provided that the limit switch is carefully constructed, it is possible to raise the contact resistance between the contacts 26 and 27 to above 1 megohm upon displacement of the projection 33 of the operating member over a distance of only 0.001 mm.

FIG. 4 shows a limit switch with which this characteristic can be achieved. It comprises a fork-shaped switch frame 66, which rests at one end on a working surface 69, which is engaged by pins 67 and 68 attached to prongs 80 and 81 and of the frame 66. The shank 82 of the frame rests on a pin 70. It will be clear that the switch frame is supported at three points. The working surface is rotatably supported, in a way which is not shown in the drawing, by the frame of a machine tool for punching holes in spinnerets. Both the supporting means and the pin 70 are fixedly attached to said frame. The switch frame 66 carries a hook-shaped projection 71 in which there is turned a set screw 72. The end 73 of said set screw serves as contact point and co-operates with a contact surface 74 provided thereunder. The contact surface 74 is provided on a switch arm 76, which hinges at 75. A spring 77 tends to press the contact surface 74 against the contact point 73. The work, in the form of a spinneret 78, rests on the working surface 69. Mounted over the spinneret 78 is a punch 1, which is fastened in a punch holder 79. This punch holder co-operates with the switch arm 76 in that the free end of the latter extends to a point under the punch holder.

It will be clear that the projection 71 could be omitted if the switch arm were provided on the bottom of the switch frame 66. In that case the set screw 72 could be provided in the shank 82 of the switch frame 66.

The lines 31 and 32 of the switching circuit are connected to the contact surface 74 and the contact point 73, respectively, and to the switching unit 19, which is illustrated in detail in FIG. 3. Appropriate insulation ensures that if the limit switch is open, the circuit is not closed by switch parts other than the contacts 73 and 74. The above-described limit switch, together with the punch 1, is movable relative to the workpiece, in order that holes may be punched at various distances from the center of the spinneret. The position of the punch and the limit switch relative to each other is such that the line connecting the points of support of the pins 67 and 68 passes through the point of the punch 1. The working surface 69 has further been so machined that it forms a very good reference base for the bottom of the spinneret. In this way it is possible to very accurately measure the movement of the tool or punch relative to the workpiece comprising the spinneret and to open the limit switch when the tool is moved to a precisely defined position relative to the workpiece. Furthermore, as the limit switch is to switch only a low current and voltage, contact wear on account of spark formation is minimized.

With a positioning apparatus as shown in FIGS. 3 and 4, it was established that at a punching speed of 30 mm./sec. and a punching force of 8 kg. the punch reached its desired position with a reproducible precision of a few microns. Use was made of a switching transistor of the type 2N2528 having a maximum permissible collector voltage of 160 volts. The magnitude of the excitation current to be switched was 3 amperes.

It will be obvious that the above-discussed positioning apparatus is not only suitable for the aforementioned applications, but it may also be employed for accurately placing insertion pieces into spinneret plates. These insertion pieces are provided with a spinning passage through which the spinning material, such as a polymer, is forced.

Another very suitable application is in the field of electrolytic drilling. In this case use is made of a hollow electrode through which a solution of electrolyte is passed. The electrode and the workpiece (e.g. an insertion piece as described above) are connected to a direct current source. This electrochemical treatment calls for a high current. In the case of a short circuit between the electrode and the workpiece the current must be very rapidly switched off. However, this is very difficult because of the extraordinarily high current. A satisfactory solution to this problem is to displace the electrode with the aid of the positioning apparatus of the invention. The electromagnetic coupling may be caused to be switched off the moment the current in the D.C. source-electrode-workpiece circuit exceeds a particular value. Moreover, if use is made of an elastic element to provide a counteracting force, then when a particular current value is exceeded, the electrode will be withdrawn very rapidly.

Although in the above embodiments, the body makes a translatory movement, or a substantially translatory movement, the invention may also be used for limiting the rotary movement of a body, for instance, if a driving shaft is to turn a rotatably supported body to a given angular position. In this case there is provided between the driving shaft and the body an electromagnetic coupling, which is controlled in the above-described way. The limit switch could then be operated by a cam disk or the like, which is coupled to the body.

We claim:
1. In a positioning apparatus for moving a body into a desired position comprising a driving mechanism for displacing said body, an electromagnetic coupling one part of which is coupled to the driving mechanism and another part to the body, a switch mechanism for switching on and off the excitation of said electromagnetic coupling, said switch mechanism comprising a limit switch means cooperating with said body to cause said switch mechanism to switch the excitation current of the electromagnetic coupling between on and off, the improvement whereon said positioning means includes operating means independent of said electromagnetic coupling to reengage said parts of said coupling after said parts have been disengaged.

2. A positioning apparatus as recited in claim 1 wherein said operating means forms part of the driving mechanism.

3. A positioning apparatus as recited in claim 1 wherein means are provided to exert on said body, at least during the last portion of the movement of the body to said desired position, a force which counteracts said movement.

4. A positioning apparatus as recited in claim 3 wherein said means to apply a force to said body comprises an elastic element.

5. A positioning apparatus as recited in claim 1 wherein said electromagnetic coupling comprises an excitation coil and two magnetizable core parts with very low eddy-current loss, one of said core parts being coupled to said body and the other of said core parts being coupled to said driving mechanism.

6. A positioning apparatus as recited in claim 5 wherein said core parts are made of thin laminations.

7. A positioning apparatus as recited in claim 5 wherein at least one Zener diode is connected to said excitation coil to set an upper limit to the self-induction voltage which occurs when the excitation of said electromagnetic coupling is switched off, and said Zener diode relative to the polarity of the self-induction voltage being connected in the blocking direction.

8. A positioning apparatus according to claim 7 wherein said Zener diode is connected in parallel with said excitation coil of said electromagnetic coupling.

9. A positioning apparatus as recited in claim 1 wherein said limit switch comprises a switch frame relative to which said body makes its movement, a first contact carried by said frame, an operating element which comes into contact with the body when the said body has reached said desired position and a second contact carried by said operating element and cooperating with said first contact.

10. A positioning apparatus as recited in claim 1 wherein the contacts of said limit switch are normally closed and are opened when said body reaches said desired position.

11. A positioning apparatus as recited in claim 5 wherein there is provided a first lever which can turn on a fixed fulcrum coupled to said body, and a second lever hingedly connected with the first lever, wherein said two core parts are placed opposite each other and are connected to said first and second levers, respectively, wherein said driving mechanism exerts a driving force on said second lever, and wherein there is provided an elastic element coupled to said first lever to exert on said first lever a force that counteracts said driving force.

12. A positioning apparatus as recited in claim 11 wherein the fulcrums of said first and second levers coincide.

13. A machine tool for machining a workpiece provided with a positioning apparatus as recited in claim 1 for supporting one of a tool and workpiece and for effecting a relative movement of the tool and the workpiece.

14. A machine tool for making a hole in a workpiece provided with a positioning apparatus as recited in claim 1 for effecting a relative movement of the tool and the workpiece along the axis of the hole.

15. A machine tool as recited in claim 13 in which the relative movement of the tool and the workpiece is determined with reference to a measuring surface wherein said limit switch comprises a fork-shaped switch frame having two prongs and a shank, means supporting said frame at three points, two of said points being at the ends of said prongs and the third of said points being the free end of the shank, said points at the ends of said prongs being positioned on said surface in such a way that the line connecting such points intersects the center line of the tool, a switch arm hingedly coupled to said switch frame adapted to be operated by the tool, and two co-operating contacts, one being attached to said switch frame and the other being attached to said switch arm.

(References on following page)

References Cited

UNITED STATES PATENTS

| | | | |
|---|---|---|---|
| 2,441,517 | 5/1948 | Sussman | 72—430 |
| 2,517,502 | 8/1950 | Miller | 72—430 X |
| 1,684,296 | 9/1928 | Brodsky | 83—577 X |

ANDREW R. JUHASZ, Primary Examiner
J. F. COAN, Assistant Examiner

U.S. Cl. X.R.

72—430; 83—576, 605; 173—124